March 8, 1949.

A. B. STEINER ET AL
SUBSTITUTED ALKYLENE GLYCOL
ESTERS OF ALGINIC ACID
Filed Aug. 2, 1947

2,463,824

ALGINIC ACID-FRAGMENT OF CHAIN 9,10-EPOXYOCTADECANOIC ACID
EPOXYSTEARIC ACID 9,10-EPOXYOCTADECYL ALCOHOL
EPOXYSTEARYL ALCOHOL

OLEIC ACID GLYCOL ALGINATE

OLEYL ALCOHOL GLYCOL ALGINATE

ARNOLD B. STEINER
WILLIAM H. McNEELY
INVENTORS

ATTORNEY

Patented Mar. 8, 1949

2,463,824

UNITED STATES PATENT OFFICE 2,463,824

SUBSTITUTED ALKYLENE GLYCOL ESTERS OF ALGINIC ACID

Arnold B. Steiner, La Jolla, and William H. McNeely, San Diego, Calif., assignors to Kelco Company, San Diego, Calif., a corporation of Delaware Application August 2, 1947, Serial No. 765,670

11 Claims. (Cl. 260—209.6)

This invention relates to reactions between alginic acid and certain of the substituted epoxyparaffins or alkylene oxides by which the properties of the acid are changed in a manner which imparts a new utility to the product.

This invention relates also to the products of the above recited reactions, these products having the desirable properties of the water-soluble salts and lower alkylene glycol esters of alginic acid, together with certain other useful properties which these compounds do not possess.

In a copending application filed April 3, 1944, by Arnold B. Steiner under Serial No. 529,423, now Pat. No. 2,426,125, it is disclosed that alginic acid may be reacted directly with alkylene oxides containing not more than five carbon atoms to form a theretofore unknown series of addition compounds which have been termed "glycol alginates."

In a subsequent copending application filed on January 3, 1947, by Arnold B. Steiner and William H. McNeely under Serial No. 723,116, the addition compounds of alginic acid and the higher oxides containing from six to eighteen carbon atoms are described. These glycol alginates or addition compounds of the lower and higher oxides with alginic acid differ from alginic acid and from the water-soluble alkali metal alginates in the following respects.

Alginic acid is substantially insoluble in water; its salts with the alkali metals, magnesium, ammonium and many organic bases are freely water-soluble, yielding colloidal solutions of high viscosity. The glycol alginates likewise are freely water-soluble and form viscous and colloidal solutions.

The soluble salts of alginic acid above described form gels or gelatinous precipitates with the water-soluble salts of the alkaline-earth metals (except magnesium), of aluminum and of the heavy metals, and with all but the weakest of the acids. By contrast, the glycol alginates show much less reactivity with the salts and the acids which gelatinize or precipitate the soluble alginic salts.

The soluble alginic acid salts are generally prepared to give a pH value above 5.0, whereas the glycol alginates may be produced with pH values up to 6.5 but ordinarily are below pH 5.0. Thus the ranges are upward from pH 5 with the alginic salts and downward from pH 5 in the case of the esters.

The reaction between alginic acid and the lower epoxyparaffins (five carbon atoms or less) takes place with considerable readiness. As disclosed in the above copending application, a moist alginic acid in fibrous or other subdivided form is treated with the alkylene oxide in a closed vessel, the reaction usually coming to completion in from one to three hours. The product retains the fibrous form (unless a large excess of water be present) and appears in the original degree of comminution. No further preparation is required other than to evaporate or extract any excess oxide which it may contain and to bring the water content to a standard.

For the reaction with the higher oxides as disclosed in the above copending application Serial No. 723,116, more difficulty was found in reacting alginic acid with the higher oxides (six to eighteen carbon atoms), the difficulty increasing as the molecular weight of the oxide increased. The difficulty in obtaining a satisfactory addition product was overcome by certain modifications of the original process, for example: (a) by the partial neutralization of the alginic acid prior to esterification, as disclosed in the copending application of Arnold B. Steiner and William H. McNeely, filed December 22, 1945, under Serial No. 636,938; and/or (b) by reacting the alginic acid with the higher oxide in the presence of a water-miscible solvent such as acetone, glycerol or one of the lower aliphatic alcohols; or (c) by reacting the alginic acid with a higher oxide and again reacting the primary product with one of the lower oxides.

For the reaction, herein described, of the hydroxy and carboxy substituted eighteen carbon alkylene oxides with alginic acid, these latter modifications were used in the process of manufacture since the substitute oxides behave like the higher alkylene oxides for this reaction.

The alginic acid used as raw material may be produced by any of the methods known in the prior art, preferably by a method such as that of the Thornley and Walsh Patent 1,814,981 which yields the free acid in fibrous form. The acid need be only in a state of commercial purity and preferably contains a small proportion of calcium.

The free acid is first brought to the physical condition in which it is most amenable to reaction with the alkylene oxide. This involves reduction of the original water content, which is of the order of 80%, to approximately 50% by weight. A desirable way of producing this reduction is by repeated passage of the acid through a hammer mill supplied with a current of warm, dry air but any method of drying by gentle heating, evacuation or extraction with water-miscible solvents may be used.

A water content of from 45% to 55%, while not critical, has been found to give the best reaction rate during esterification with the least hydrolysis of the alkylene oxide. The reduced water content also strongly facilitates subdivision, the product of the above combined drying and shredding step being a fluffy mass of fine, thread-like fibres which expose a very large surface area per unit of mass.

The step of partial neutralization described in copending application Serial No. 636,938 is not essential to esterification with the substituted oxides, but it is highly desirable. The use of this step renders it possible to stabilize the product by raising its pH value above the critical level, reducing the number of free carboxyl groups in the final product. It also facilitates the production of a fully soluble glycol alginate, reduces the extent to which both the alginic acid and the substituted alkylene oxide are hydrolized during the esterifying reaction, and materially accelerates the reaction between the oxide and the acid.

Partial neutralization may be produced before, during or after the drying step. In general, the method used is to react the acid with any base producing a water-soluble salt of the acid, as for example ammonia, the lower amines or any of the basic compounds of the alkali metals or magnesium. The preferred base, which may be used in the form of the hydroxide, carbonate or phosphate, may conveniently be reacted with the acid by mixing the acid with an alcoholic solution or slurry of the base. In reactions involving the lower oxides a relatively small portion of the carboxyl groups are thus satisfied but for reaction with the higher oxides and the eighteen carbon substituted alkylene oxides we prefer to neutralize from 25% to 50% of the carboxyl groups, thus hastening the esterification and improving the solubility of the final product.

Hydroxy and carboxy substituted alkylene oxides containing eighteen carbon atoms may be prepared by any of the methods described in the literature. In the instant experiments the method reported by Findley et al. in The Journal of the American Chemical Society, 67, page 412 (1945) was followed. This method employs peracetic acid to epoxidize the corresponding olefin to the epoxy derivative. Thus 9,10-epoxystearic acid was prepared by reacting oleic acid with peracetic acid and 9,10-epoxystearyl alcohol by reacting oleyl alcohol with this acid.

The substituted alkylene oxides are sparingly soluble in water and as these reactions are carried out essentially in an aqueous medium, it is desirable to increase the concentration of the oxide in the reaction medium. Increasing the excess of oxide does not noticeably improve the extent of esterification and it appears that the relative water solubility of the oxide is the limiting factor. Raising the temperature of the reaction increases the solubility of the oxide and therefore the velocity of the reaction but tends to degrade the acid by depolymerization. Increasing the water content of the reaction mixture tends (as does the elevation of temperature) to increase the extent to which hydrolysis of the oxide to the corresponding glycol occurs.

The use of a water-miscible solvent in the reaction medium, however, increases the concentration of oxide in the solution and thereby accelerates the desired reaction between the oxide and the alginic acid, and at the same time tends materially to restrain the undesired hydrolysis of the oxide. For this purpose any organic liquid which is inert to the alginic acid and to the oxide, which is a solvent for the oxide and which is soluble in water may be used. A wide variety of mutual solvents are available for this purpose, for example, a selection may be made from the group including the lower monohydric and polyhydric alcohols.

For the reaction of alginic acid with the substituted oxides, the contacting vessel should be provided with an efficient stirring apparatus to insure complete contact between the components of the reaction mixture. Means to control the temperature, such as a jacket arranged for both heating and cooling, should be provided. The feasible temperature limits for esterification appear to be about 35° and 70° C. while the indications are that the optimum temperature lies within the range 45° to 60° C., varying somewhat with other conditions.

The examples below indicate practical ways of effecting the reaction and describe the products obtained.

EXAMPLE 1

Preparation of oleic acid glycol alginate

Moist, commercial alginic acid was prepared for partial neutralization by suspending 1420 parts of the acid (300 parts dry weight) in 900 parts of isopropyl alcohol with five minutes' stirring. A slurry of 42 parts of trisodium phosphate in 600 parts of alcohol was then added, this quantity being sufficient to neutralize about 35% of the carboxyl groups of the acid. After thirty minutes' stirring the reaction product was drained, squeezed as dry as possible and shredded in a hammer mill repeatedly until the moisture content was about 50% of the total weight.

The following mixture was reacted for 12 hours at 50° C. in a jacketed mixer. An equivalent weight of 215 was used for the commercial alginic acid.

```
                                                  Parts
Alginic acid, 35% neutralized, dry weight _____ 171
Water, carried by acid _____ 150
Glycerol _____ 150
9,10-epoxystearic acid (2.3 equivalents) _____ 670
```

The waxy reaction product, after cooling, was extracted with acetone to recover any excess oxide and any glycols which had formed, and was dried in a hot air drier for thirty minutes at 55° C. The yield of the oleic acid glycol alginate was 180 parts, dry weight, or 120% on the original anhydrous acid. A 1¼% solution of the ester was slightly hazy and gave a pH value of 3.8. Neutralization and hot saponification showed that 36% of the carboxyl groups in the product were free, 29% were esterified and 35% were neutralized with sodium.

EXAMPLE 2

Preparation of oleyl alcohol glycol alginate

Following the procedure above described, alginic acid (150 parts dry weight) was 35% neutralized with trisodium phosphate (21 parts) and dried to 55% solids.

The following mixture was reacted in the jacketed vessel for 11 hours at 50° C. The reaction product was extracted with acetone and dried for forty-five minutes at 55° C.

```
                                                  Parts
Alginic acid, 35% neutralized, dry weight _____ 171
Water _____ 123
Acetone _____ 123
9,10-epoxystearyl alcohol (2¼ equivalents) _____ 450
```

The yield of oleyl alcohol glycol alginate was 200 parts or 133% on the original anhydrous acid. A 1¼% solution of the ester was cloudy, with a pH value of 3.6 and a viscosity of 350 centipoises. Neutralization and saponification indicated that 50% of the carboxyl groups were free, 15% were esterified and 35% were neutralized with sodium.

EXAMPLE 3

*Preparation of mixed glycol alginates*

Reaction products approaching complete esterification and having highly desirable properties may be prepared by the method illustrated in this example, the product of the reaction with one of the substituted oxides being again reacted on by an oxide of considerably lower molecular weight.

A portion (100 parts) of the oleyl alcohol glycol alginate product obtained in Example 2 was washed with a cold, 50–50 water-alcohol mixture previously brought to pH 1.8 with hydrochloric acid, to free the carboxyls of the original products that were combined with sodium. The ester was washed twice with 50% alcohol and then slurried with a 50% alcoholic solution of 2.6 grams of trisodium phosphate to neutralize about 10% of the free carboxyls with sodium before drying to 50% solids.

The following mixture was reacted in an autoclave for 8 hours at 50° C. The reaction product was extracted with acetone and dried for thirty minutes at 55° C.

|  | Parts |
|---|---|
| Free acid oleyl alcohol derivative 10% neutralized, dry weight | 103 |
| Water | 100 |
| 1,2-epoxypropane (4 equivalents) | 84 |

The yield was 134 parts, or 134% on the oleyl alcohol glycol alginate used as a starting material. The mixed ester dissolved in water to give a hazy solution of pH 3.4. On saponification and calculation, 19% of the carboxyl groups were shown to be free, 15% were esterified with the oleyl alcohol derivative and 56% with the propylene derivative, and 10% were combined with sodium.

A large number of mixed esters may be formed in this general manner, by subjecting the product of a first reaction with one of the substituted oxides to a second reaction with one of the lower oxides. Ordinarily, ethylene or propylene oxide will be used for the second reaction, by reason of the availability and low cost of these agents.

*Materials and reactions*

As will be evident from the above examples, this invention contemplates reaction between alginic acid and either the 9,10-oxide of oleic acid (9,10-epoxyoctadecanoic acid) or the corresponding oxide of oleyl alcohol (9,10-epoxyoctadecyl alcohol). The structures of these materials and the probable structures of their reaction products are illustrated in the figures of the attached drawing, in which Fig. 1 illustrates the known structure of alginic acid, the figure showing three units of what is ordinarily a long polymeric chain;

Figure 1:
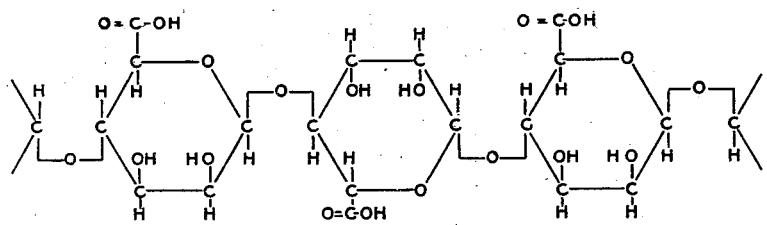
Figure 2:
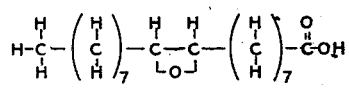
Fig. 2 illustrates the known structure of 9,10-epoxyoctadecanoic acid.
Figure 4:
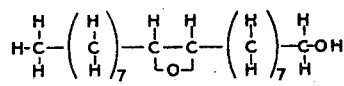
Fig. 4 illustrates the known structure of 9,10-epoxyoctadecyl alcohol.
Figure 3:
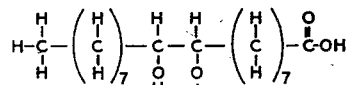
Fig. 3 illustrates a probable structure for the product of reaction between alginic acid and the oxide of Fig. 2.
Figure 5:
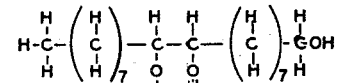
Fig. 5 illustrates a probable structure for the product of reaction between alginic acid and the oxide of Fig. 4.

It will be noted that in Figs. 3 and 5 a single unit only of the alginic polymer is shown, all esterified units having the same structure.

The reactions shown in Figs. 3 and 5 are addition reactions and the products are addition products, all of components of each pair of raw materials being present in the corresponding product. The products are difficult to name structurally as the linkage between alginic acid and the stearic compound may occur in either the 9 or the 10 position, and in practice, undoubtedly occur in both positions, yielding mixtures.

These mixed products are referred to herein, collectively as oleic glycol alginates, and individually as oleic acid glycol alginate and oleyl alcohol glycol alginate. They may also be described as the alginic acid esters of 9,10-dihydroxyoctadecanoic acid and of 9,10-dihydroxyoctadecanoic alcohol.

The diagrams do not illustrate the modified structures of products only partly esterified, or of products partly esterified and partly neutralized. Alginic acid is a straight chain polymer which may contain from one hundred to several hundred units. Where the alginic acid is only partly esterified, the carboxyl group of any one unit of the chain may be reacted either with the alkali used in partial neutralization or with the stearic compound, or it may be free, and in the examples all three of these conditions obtain in the product molecule. In addition, if the initial reaction product be further reacted, as in Example 3, with one of the lower oxides, up to say 5 carbon atoms, such as 1,2-propylene oxide, the carboxyl group of any one or more of the remaining free alginic units may be esterified, yielding mixed esters.

*Properties of products as compared with alginic salts*

The products of the above described reactions are fibrous solids which are soluble in water.

The water-soluble alginic salts (e. g., sodium and ammonium alginate) are extremely reactive with strong acids and salts of the heavy metals and the alkaline-earth metals, giving gels or precipitates. The glycol alginates of the substituted and higher oxides are less reactive than the salts, while the glycol alginates with the lower oxides are still less reactive.

For example, a sodium alginate solution gives a fibrous precipitate on the addition of calcium chloride solution; the substituted and higher glycol alginates yield hard gels, while the lower glycol alginates yield soft gels under the same conditions.

These differences in reactivity, however, are due to the lower degree of esterification producible with the substituted and the higher oxides rather than to the lengthening of the hydrocarbon chain, and the reactivity falls off rapidly as the percentage esterification increases. In all cases the compatibility of the reaction products with acids and with alkaline-earth metal salts improves as the degree of esterification is increased, and for this reason the use of the lower oxides as described in Example 3 is often highly advantageous.

*Proportioning of solvent*

The 50–50 ratio of solvent to water used in these experiments is not critical though it is generally satisfactory. The effect of the solvent in promoting reaction appears to increase as the proportion increases, up to the point at which the hydrophilic solvent begins to shrink and harden the acid fiber by withdrawing water from it. With different organic solvents the optimum water:solvent ratio may vary considerably, but the step is at least moderately effective within the limits 80 water:20 solvent to 30 water:70 solvent.

*Evaluation of emulsifying power of the product*

The major utility of the esters herein described is as emulsifying agents or, perhaps more accurately, as emulsion stabilizers. For this purpose the substituted oxide reaction products show to material advantage as compared with the lower oxide products, and to very great advantage as compared with the water-soluble alginic salts such as sodium alginate.

The following quick-breaking test was devised for evaluating the emulsion stabilizing value of the product and is conducted as follows. A 50% emulsion of a light mineral oil was made by adding the oil to a water solution of the ester while stirring at 800 R. P. M. The concentration of the glycol alginate in each case was 0.6% of the weight of the completed emulsion. In order to eliminate variations in the viscosities of different esters, enough sodium alginate was added to each solution to bring the viscosity to about 100 centipoises. This addition varied from 0.02% to 0.40% of the emulsion weight. To control the effect of pH the solution was titrated with sodium hydroxide solution to bring the pH within the range 5 to 6. Sodium benzoate, 0.2%, was added as a preservative.

After stirring the mixtures of oil and solution until thoroughly blended the emulsions were twice homogenized, using the same apparatus, speed and feed rate in each case. The homogenized emulsions were placed in 70 x 25 mm. vials and stored at a constant temperature of 50° C., the separation of water in the bottom of the vial being noted at intervals and recorded in millimeters. These results yielded curves from which the time required to produce a 3 mm. break could be read with considerable accuracy. The results obtained are tabulated below.

*Emulsion stability tests*

| Emulsion Stabilizer | mm. break after storing for— | | | | | Days for 3 mm. break |
|---|---|---|---|---|---|---|
| | 15 min. | 1 day | 2 days | 6 days | 20 days | |
| Propylene Glycol Alginate. | ------ | 0.0 | 1.5 | 10.5 | 26.0 | 3. |
| Oleic Acid Glycol Alginate. | ------ | 0.0 | 1.0 | 5.5 | 18.0 | 4. |
| Oleic Alcohol Glycol Alginate. | ------ | 0.0 | 0.0 | 2.0 | 7.0 | 9. |
| Propylene-Oleic Alcohol Glycol Alginate. | ------ | 0.0 | 0.0 | 0.5 | 3.0 | 20. |
| Sodium Alginate | 2.0 | (¹) | ------ | ------ | ------ | ½ hr. |
| Sodium Stearate | ------ | 20.0 | (¹) | ------ | ------ | 3 hrs. |
| 9,10-epoxystearyl Alcohol. | (¹) | ------ | ------ | ------ | ------ | 0 hr. |

¹ Complete.

It will be evident from these results that the oleic acid and alcohol glycol alginates, ranging from 29% to 15% esterification, are materially more effective than the propylene ester at about 70% esterification. The emulsifying value of the sodium alginate, sodium stearate and the original starting material 9,10-epoxystearyl alcohol, is negligible in this quick-breaking emulsion. This clearly shows that the alginate ester is the necessary emulsion stabilizer and is incomparably more efficient than the starting materials used in their preparation.

We claim as our invention:

1. The method of modifying alginic acid to render it useful as an emulsifying agent which comprises: esterifying at least a portion of the free carboxyl groups of said acid with an agent selected from the group consisting of 9,10-epoxystearic acid and 9,10-epoxystearyl alcohol.

2. The method of modifying alginic acid to render it useful as an emulsifying agent which comprises: neutralizing a portion only of the free carboxyl groups of said acid with an alkaline agent forming a water-soluble alginic salt, and esterifying at least a portion of the remaining free carboxyl groups of said acid with an agent selected from the group consisting of 9,10-epoxystearic acid and 9,10-epoxystearyl alcohol.

3. The method of modifying alginic acid to render it useful as an emulsifying agent which comprises: esterifying a portion only of the free carboxyl groups of said acid with an agent selected from the group consisting of 9,10-epoxystearic acid and 9,10-epoxystearyl alcohol, and esterifying at least a portion of the remaining free carboxyl groups of said acid with an epoxyparaffin having not to exceed five carbon atoms.

4. The method of modifying alginic acid to render it useful as an emulsifying agent which comprises: neutralizing a portion only of the free carboxyl groups of said acid with an alkaline agent forming a water-soluble alginic salt; esterifying a portion only of the remaining free carboxyl groups of said acid with an agent selected from the group consisting of 9,10-epoxystearic acid and 9,10-epoxystearyl alcohol, and further esterifying at least a portion of the then remaining free carboxyl groups of said acid with an epoxyparaffin having not to exceed five carbon atoms.

5. The method of modifying alginic acid to render it useful as an emulsifying agent which comprises: neutralizing a portion only of the free carboxyl groups of said acid with an alkaline agent forming a water-soluble alginic salt; esterifying a portion only of the remaining free carboxyl groups of said acid with an agent selected from the group consisting of 9,10-epoxystearic acid and 9,10-epoxystearyl alcohol, acting on the product of said treatment with a dilute acid to liberate at least a part of the neutralized carboxyl groups of said acid, and further esterifying at least a portion of the then remaining free carboxyl groups of said acid with an epoxyparaffin having not to exceed five carbon atoms.

6. A water-soluble modification product of alginic acid having powerful emulsifying properties, in which a part of the carboxyl groups of said acid are esterified with an agent selected from the group consisting of 9,10-epoxystearic acid and 9,10-epoxystearyl alcohol.

7. A water-soluble modification product of alginic acid having powerful emulsifying properties, in which a part of the carboxyl groups of said acid are combined with an alkali forming a water-soluble alginic salt and a part of said carboxyl groups are esterified with an agent selected from the group consisting of 9,10-epoxystearic acid and 9,10-epoxystearyl alcohol.

8. A water-soluble modification product of alginic acid having powerful emulsifying properties, in which a part of the carboxyl groups of said acid are combined with an alkali which forms a water-soluble alginic salt, a part of said carboxyl groups are esterified with an agent selected from the group consisting of 9,10-epoxystearic acid and 9,10-epoxystearyl alcohol, and a part of said carboxyl groups are esterified with an alkylene glycol group having not to exceed five carbon atoms.

9. A water-soluble modification product of alginic acid having powerful emulsifying properties, in which a part of the carboxyl groups of said acid are combined with an alkali which forms a water-soluble alginic salt, a part of said carboxyl groups are esterified with an agent selected from the group consisting of 9,10-epoxystearic acid and 9,10-epoxystearyl alcohol, a part of said carboxyl groups are esterified with an alkylene glycol group having not to exceed five carbon atoms, and a part of said carboxyl groups are uncombined.

10. A water-soluble modification product of alginic acid having powerful emulsifying properties, in which a part of the carboxyl groups of said acid are esterified with 9,10-epoxystearic acid.

11. A water-soluble modification product of alginic acid having powerful emulsifying properties, in which a part of the carboxyl groups of said acid are esterified with 9,10-epoxystearyl alcohol.

ARNOLD B. STEINER.
WILLIAM H. McNEELY.

No references cited.